United States Patent [19]

Gilman

[11] Patent Number: 4,596,902

[45] Date of Patent: Jun. 24, 1986

[54] PROCESSOR CONTROLLED EAR RESPONSIVE HEARING AID AND METHOD

[76] Inventor: Samuel Gilman, 11920 Dorothy St., Los Angeles, Calif. 90049

[21] Appl. No.: 755,467

[22] Filed: Jul. 16, 1985

[51] Int. Cl.[4] .......................... H04R 25/00; H04R 3/04; H04B 15/00

[52] U.S. Cl. ................................. 179/107 FD; 381/68; 381/94; 381/96

[58] Field of Search ..................... 179/107 FD, 107 R; 381/68, 94, 95, 96, 104, 111, 120, 122

[56] References Cited

U.S. PATENT DOCUMENTS

| | | | |
|---|---|---|---|
| 2,948,778 | 8/1960 | Clements | 381/96 |
| 3,057,961 | 10/1962 | Turner | 381/96 |
| 4,508,940 | 4/1985 | Steeger | 179/107 FD |
| 4,543,453 | 9/1985 | Brander | 179/107 R |

FOREIGN PATENT DOCUMENTS

| | | | |
|---|---|---|---|
| 2808516 | 9/1979 | Fed. Rep. of Germany | 179/107 FD |
| WO83/02212 | 6/1983 | World Int. Prop. O. | 179/107 R |

OTHER PUBLICATIONS

*Electronics*, "Digital Processor Improves Speech-Signal Quality", vol. 55, No. 4, Feb. 24, 1982, pp. 122–123.

*Primary Examiner*—Gene Z. Rubinson
*Assistant Examiner*—Danita R. Byrd
*Attorney, Agent, or Firm*—Timothy T. Tyson

[57] ABSTRACT

A processor controlled ear responsive hearing aid for the ear of a hearing impaired individual and method for operating a hearing aid. The input from the microphone is amplified and split into a plurality of band-pass channels each having a frequency range of approximately one-third octave. Each channel has an amplifier that is controlled by the processor. The processor receives control signals from a feedback microphone located in the ear canal and uses the control signals to develop a spectrum of the actual sound pressure levels by frequency at the eardrum. The processor compares averages of the actual sound pressure levels to the desired levels for each channel and for the overall output according to a predetermined set of instructions and controls the channel amplifiers and an output amplifier to produce the desired sound pressure levels for each frequency in the ear canal.

24 Claims, 5 Drawing Figures

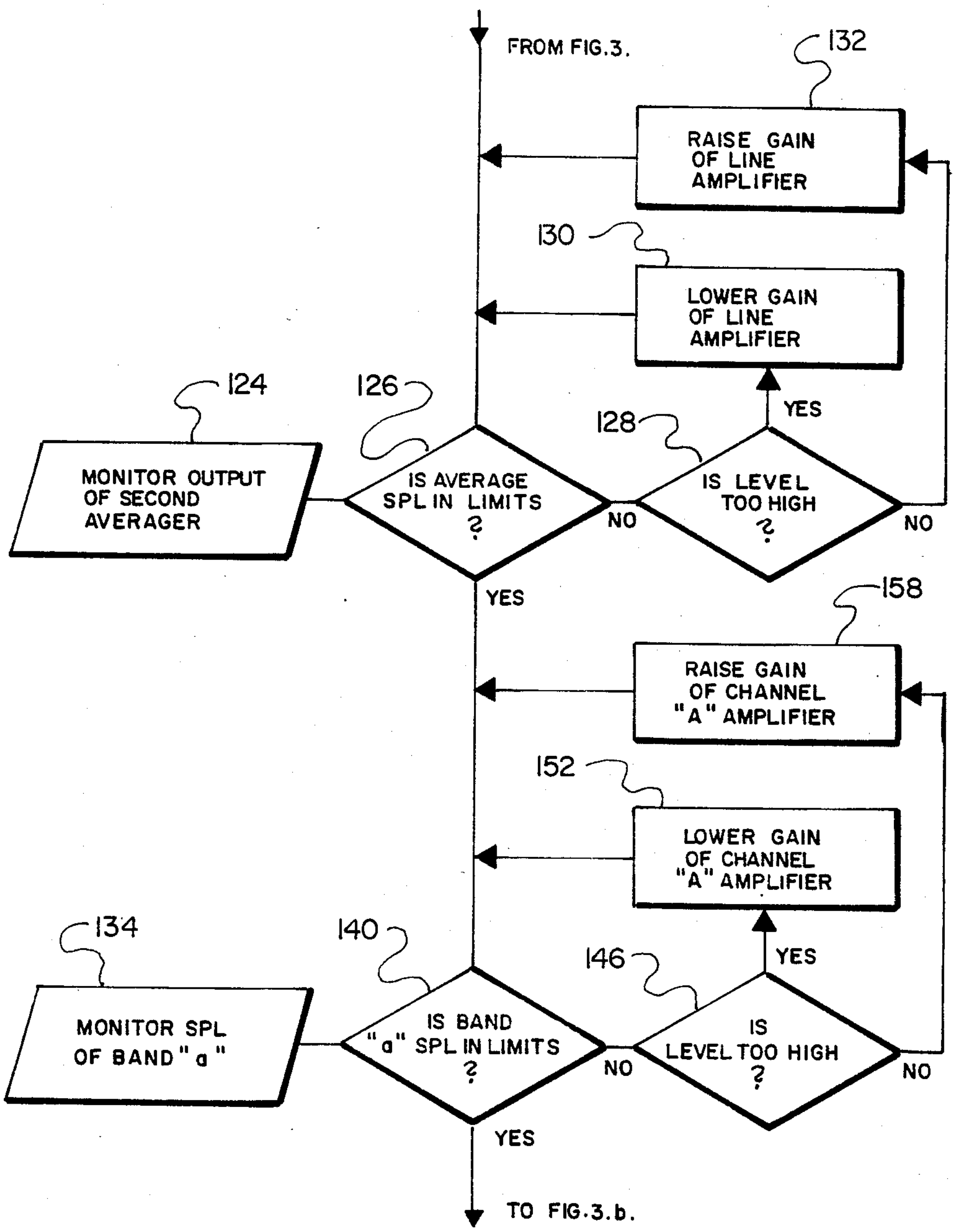
Fig.3.a.

Fig. 3. b.
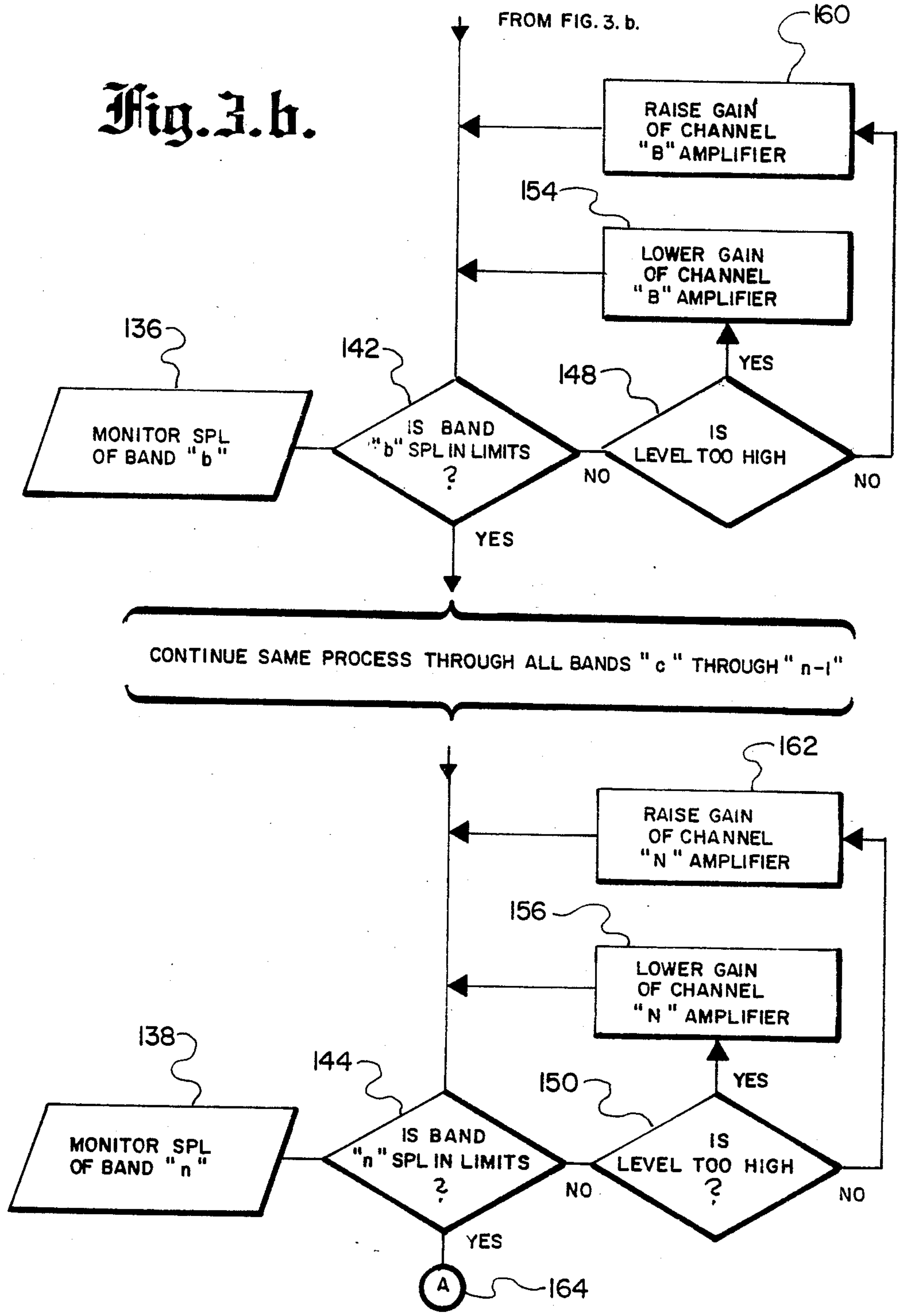

PROCESSOR CONTROLLED EAR RESPONSIVE HEARING AID AND METHOD

BACKGROUND OF THE INVENTION

1. Field of the Invention

The present invention pertains to the hearing aid art, and more particularly, to a hearing aid and method having a feedback microphone in the ear canal and a processor for comparing the spectrum of the actual amplified sound pressure levels at the eardrum to desired levels and controlling amplifiers to achieve the desired levels.

2. Background Art

Most current hearing aids provide one or two stage amplification of ambient sound with the sound level being controlled by the user. Some hearing aids have some frequency response shaping to improve the results for individuals with commonly found types of hearing deficiencies. With the advent of microprocessor controls, more sophisticated hearing aids have been developed that allow the hearing aid to be programmed to the requirements of the hearing impaired individual. The individual is initially tested to determine his hearing characteristics. A preset hearing aid is then selected that provides the closest approximation to the desired results.

Alternatively, a hearing aid is programmed to provide the desired results for the individual patient. A hearing aid having a microprocessor with a programmable read only memory (PROM) may be tested on the patient under actual operating conditions and various sets of amplification instructions tried before one is selected. Once the set of instructions providing the desired results is determined, the PROM is burned in retaining permanently the selected program in the memory. One example of such an application of a microprocessor to a hearing aid is for the control of a bank of band-pass channels that divide the input into the hearing aid into a plurality of frequency bands and then amplify the frequency bands independently according to the program.

A microprocessor controlled hearing aid may be provided with more than one set of operating instructions that are selected either automatically or manually according to ambient operating conditions. For example, the frequency spectra produced during a face to face conversation, a telephone conversation, a conversation in a noisy room, and by music are widely different. A hearing aid set for one operating condition produces less than an optimum output when operating under another operating condition. If the hearing aid has multiple sets of operating instructions and switches automatically, the occurrence of a new listening situation triggers a logic unit transferring the set of instructions for the new situation from the memory to the processor for use in controlling the hearing aid. If the hearing aid has a manual control, the user manually presses a switch that changes the set of instructions utilized by the processor.

Even with the advent of the application of microprocessors to the control of hearing aids to produce better results, all known hearing aids take the ambient sound waves entering the hearing aids and amplify the sound waves in arbitrary ways according to the designs of the hearing aids and then deliver the results to the ear canals of the users. The actual end results in the ear canals are in no way monitored by the hearing aids to change or modify the process to maintain optimum performances. For example peaks in the sound pressure levels at the eardrum may develop due to the output of the hearing aids and the ear canal geometry that cannot be monitored and operated upon by the hearing aids. Such output peaks may exceed the loudness discomfort level of the hearing impaired individual not only at certain frequencies but also in the overall level. This can result in a deterioration in the perception of speech by the individual. The only certain method for not introducing these problems with conventional hearing aids is to set the outputs at less than optimum levels in order to always avoid aberrations that may develop from time to time. The users can, of course, always remove the hearing aids if they are uncomfortable or adjust the controls to less than optimum in order to avoid problems.

Consequently, the need exists for improvements in hearing aids and methods for operating hearing aids that monitor the output of the hearing aids according to actual sound pressure levels at the eardrum and then control the hearing aid performance to prevent exceeding the loudness discomfort level and to optimize performance under the various conditions of input speech loudness, environmental and interfering noise, and other disturbing factors.

SUMMARY OF THE INVENTION

The present invention provides a processor controlled ear responsive hearing aid and method to satisfy the aforementioned needs. A feedback microphone in the ear canal provides a means for monitoring the actual eardrum sound pressure levels produced by the hearing aid as modified by the ear canal geometry and impedence at the eardrum. The resulting feedback electrical signals from the feedback microphone are used by a signal processor to control the hearing aid in a manner and with a precision unavailable in the prior art. The hearing aid output may be optimized at a high output level without fear of introducing uncontrollable oscillations or output peaks that exceed the loudness discomfort level. In addition, modification of the operating program to provide optimum results for various input situations as noted in the prior art is not necessary due to the inherent nature of the hearing aid. The monitoring of the actual output of the present invention in the ear canal allows the instantaneous and automatic adjustment of the hearing aid to provide optimal results under any input situation.

The processor controlled ear responsive hearing aid comprises a first input circuit means including a microphone that receives and converts the ambient sound waves to electrical signals. An amplifier amplifies the electrical signals from the microphone to provide an amplified output. An output circuit means including a receiver converts the amplified output to sound waves and delivers the sound waves to the ear canal. A second input circuit means including the feedback microphone monitors the output by receiving and converting the sound waves inside the ear canal to control electrical signals. The control electrical signals are delivered to a signal processor that computes a spectrum of the sound pressure levels at the eardrum and compares the spectrum to desired levels according to a predetermined set of instructions. The signal processor then controls the amplification of the amplifier to achieve the desired sound pressure levels in the ear canal.

The amplifier may comprise a plurality of band-pass channels that receive the electrical signals from the microphone and provide a combined amplified output. Each of the plurality of band-pass channels has a band-pass filter that attenuates frequencies outside a preselected range. For example, one embodiment of the present invention has a plurality of band-pass channels each of which has a filter that covers a frequency band of one-third of an octave. Each channel has a channel amplifier for amplifying the signals passed by the band-pass filter. The channel amplifiers are controlled individually by the signal processor according to the predetermined set of instructions. The individual control of the channel amplifiers allows the output of the hearing aid to be maintained with optimum characteristics for the hearing requirements of the user.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIGS. 3, 3A and 3B show a flow chart depicting a signal processing methodology and structure in accordance with the principles of the present invention.

DETAILED DESCRIPTION OF THE PREFERRED EMBODIMENT

Figure 1:
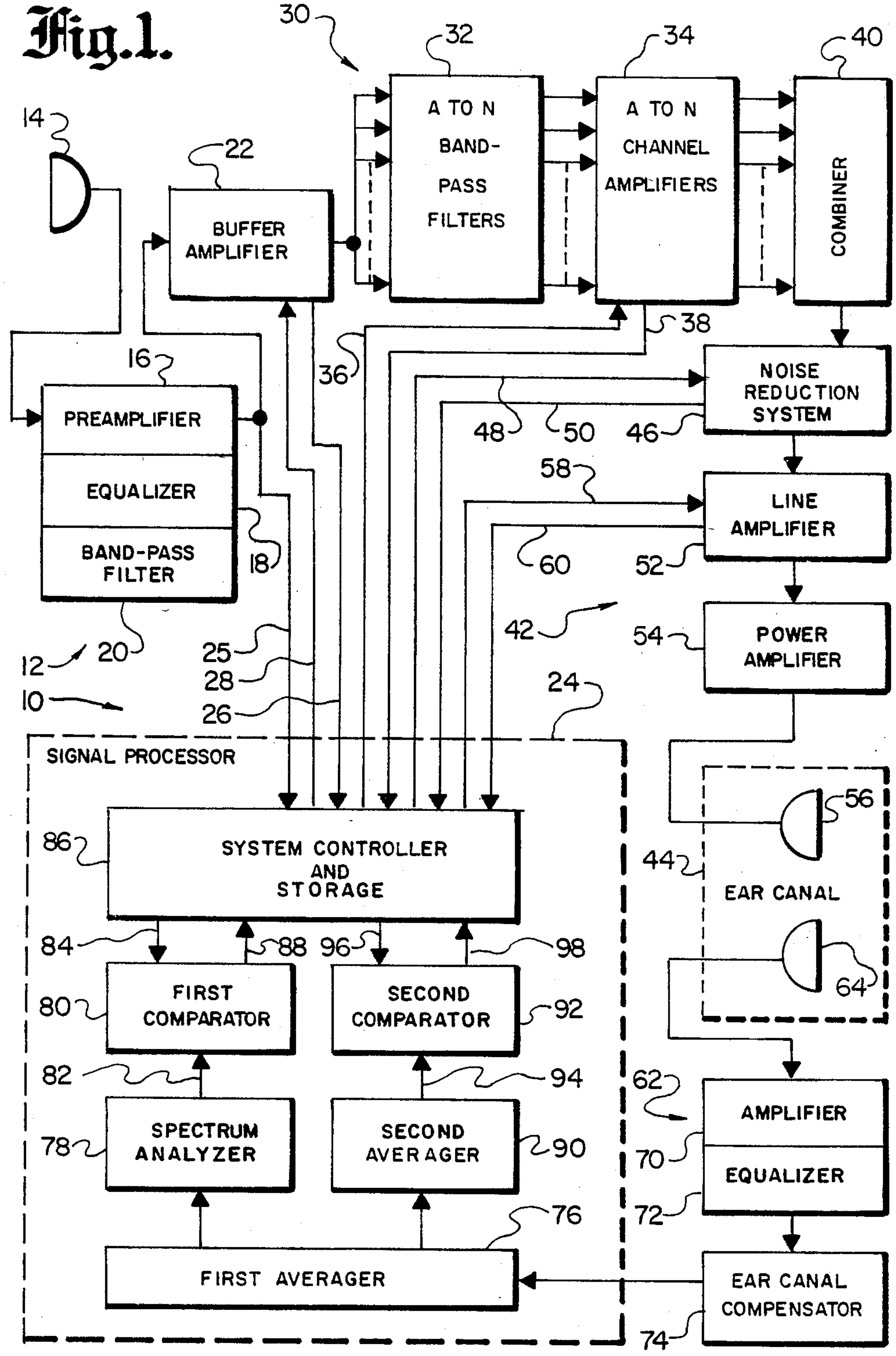
FIG. 1 is a block diagram of a processor controlled ear responsive hearing aid in accordance with the present invention.

Referring now to the drawings, and more particularly to FIG. 1, there is illustrated a block diagram of a processor controlled ear responsive hearing aid, generally designated 10, in accordance with the present invention. A first input circuit means 12 having a microphone 14 receives the ambient sound waves from the environment and converts the sound waves into electrical signals. The microphone 14 preferrably has directional characteristics in order to minimize extraneous noises. It will be appreciated that the first input circuit means 12 may substitute an electrical input from a telephone, a radio, an infrared detector or other electrical communication device for the microphone 14.

The first input circuit means 12 includes a preamplifier 16 having an equalizer 18 and an input band-pass filter 20 that together provide a flat overall response in a preselected range, e.g. 100 Hz to 8 KHz. At ambient sound pressure levels of 50–90 dB, the preamplifier 16 produces a preamplifier output with a minimum 20 dB gain. A buffer amplifier 22 in the first input circuit means 12 insures that a desired output signal level is achieved by the first input circuit means 12 that is within the requirements of the following circuits of the hearing aid 10. The input to the buffer amplifier 22 is monitored by a signal processor means 24 through a line 25 and the output is monitored through a line 26. The signal processor means 24 compares the actual output level of the buffer amplifier 22 to a desired level in a predetermined set of instructions and adjusts the output accordingly through a line 28.

An amplifier means 30 receives the electrical signals from the first input circuit means 12 and provides an amplified output. The amplifier means 30 includes a plurality of band-pass filters 32 that divide the electrical signals from the first input circuit means 12 into a plurality of channels A to N with a combined frequency range from 200 Hz to 8 kHz. Each band-pass filter attenuates frequencies outside a preselected range to create one of the channels A to N. One band-pass filter is required for each channel A to N. In the preferred embodiment of the present invention, the frequencies of one band-pass channel are logarithmically related to the frequencies of the adjacent band-pass channels in a constant fraction equal to one-third of an octave. In other embodiments, the relationships between the adjacent channels is either linear or non-linear. The non-linear relationships include, but are not limited to, critical bands and equal articulation index bands.

The amplifier means 30 also includes a plurality of channel amplifiers 34 for the channels A to N. One amplifier is required for each channel A to N to amplify the electrical signals passed by the band-pass filter that creates the channel. The amplifiers are controlled individually by the signal processor means 24 through a plurality of lines indicated by the line 36 as discussed more fully below. The dynamic range of the individual amplifiers is a minimum of 30 dB. The output of each amplifier is monitored individually by the signal processor means 24 through another plurality of lines indicated by the line 38. The amplified output of the plurality of channel amplifiers 34 is combined by a combiner 40.

An output circuit means 42 receives the amplified output from the amplifier means 30 and converts the electrical signal to sound waves that are delivered to the ear canal 44 of the hearing impaired individual. In the preferred embodiment, the first stage in the output circuit means 42 is a noise reduction system 46 that enhances the signal power output compared to the noise power output. An example of such a noise reduction system is disclosed in U.S. Pat. No. 4,025,721 to Graupe, et al. entitled "Method of and Means for Adaptively Filtering Near-stationary Noise from Speech." The noise reduction system 46 is controlled by the signal processor means 24 through a line 48 and the output of the noise reduction system 46 is monitored through a line 50. The electrical signals are then amplified in two stages by a line amplifier 52 and a power amplifier 54 prior to being converted by a receiver 56 into sound waves that are delivered to the ear canal 44 of the individual. The gain of the line amplifier 52 is controlled by the signal processor means 24 through a line 58 by a process described more fully below and ranges between no gain and the maximum desired for the eardrum sound pressure level. The output of the line amplifier 52 is monitored by the signal processor means 24 through a line 60 to insure that the clipping or saturation of the electrical signal to the receiver 56 is minimized.

The sound waves created by the receiver 56 are modified once they leave the receiver 56 by the geometry of the ear canal 44 and the impedance of the eardrum. Without control, oscillations or peaks may occur that can exceed the loudness discomfort level for the individual. As noted by Skinner in her article "Speech intelligibility in noise-induced hearing loss: Effects of high-frequency compensation" from the *Journal of the Acoustical Society of America,* January 1980, and Dirks, Kamm, Dubno, and Velde in their article "Speech Recognition Performance at Loudness Discomfort Level" from the *Scand Audiol* 1981, the output of the hearing aid for optimal performance must remain at all times and at all frequencies below the loudness discomfort level. Operation of the amplifiers 22, 34, 52, and 54 at less than optimal levels is necessary if no control is available in order to insure that the loudness discomfort level for the individual at all frequencies and under all input conditions is not reached. Such operation may substantially reduce the speech perception capability of the hearing impaired individual.

In order to optimize the operating potential of the amplifiers 22, 34, 52, and 54, the hearing aid 10 of the present invention provides control by monitoring actual sound pressure levels at all frequencies in the ear canal 44 by means of a second input circuit means 62 having a feedback microphone 64 located in the ear canal 44. Monitoring of the sound pressure levels in the ear canal 44 is in accordance with the methods of Gilman and Dirks in their article "A Probe Earmold System for Measuring Eardrum SPL Under Hearing-Aid Conditions" from the *Scand Audiol* 1984 and Gilman, Dirks, and Stern in their article "The effect of occluded ear impedances on the eardrum SPL produced by hearing aids" from the *Journal of the Acoustical Society of America,* August 1981 and these methods are incorporated herein by reference.

Figure 2:
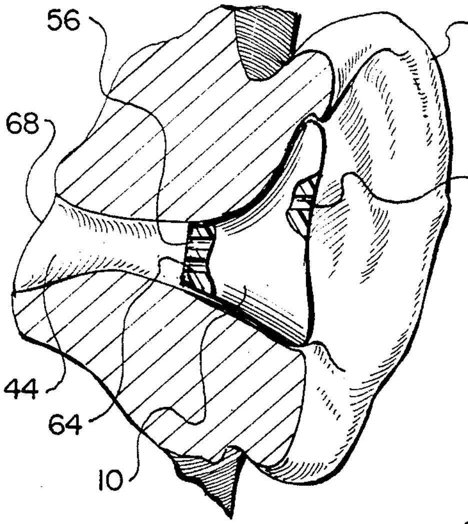
FIG. 2 is a side elevational view of the processor controlled ear responsive hearing aid of the present invention fitted into the left ear of an individual in a sectional view of the ear through the center of the ear canal.

FIG. 2 is a side elevational view of the hearing aid 10 fitted into the left ear 66 of an individual in a sectional view of the left ear 66 through the center of the ear canal 44. The hearing aid 10 takes the ambient sound from outside the ear 66 as received by the microphone 14, amplifies the sound electronically, and delivers the amplified sound to the ear canal 44 through the receiver 56. The sound waves travel down the ear canal 44 to the eardrum 68 where they are utilized by the remainder of the hearing system. The pressures created by the sound waves are detected and monitored by the feedback microphone 64 in the ear canal. While the hearing aid 10 of the present invention is shown fitted entirely in the ear, it will be appreciated that the hearing aid may be constructed with the input microphone and amplifiers or other portions physically separated from the portion located in the ear as is commonly found in traditional hearing aids.

The feedback microphone 64 receives and converts the sound waves to control electrical signals representing sound pressure levels that are amplified by an amplifier 70 shown in FIG. 1 having an equalizer 72. Ideally the feedback microphone 64 would be located at the eardrum to most precisely monitor the sound pressure levels at all of the frequencies heard by the individual. However, for practical reasons this is not ordinarily feasible and the duct leading to the feedback microphone 64 is located so that the input is in the ear canal 44 in accordance with the method of Gilman, Dirks, and Stern in their article "The effect of occluded ear impedance on the eardrum SPL produced by hearing aids" from the *Journal of the Acoustical Society of America,* August 1981. Because the various frequencies of sound waves are modified differently in a predictable manner by the geometry of the ear canal 44 and the impedance at the eardrum 68, it is possible to compensate from the sound pressure levels measured in the ear canal 44 at the feedback microphone 64 to the levels at the eardrum 68. An ear canal compensator 74 is provided in the second input circuit means 62 for this purpose. A close approximation of the actual sound pressure levels at the eardrum 68 is thereby attained.

The signal processor means 24 receives the control electrical signals from the second input circuit means 62, compares the control electrical signals to a predetermined set of instructions, and controls the amplification of the amplifier means 30 and the line amplifier 52 to achieve the desired sound pressure levels for all of the frequencies in the ear canal 44. In this manner, the hearing aid 10 quickly detects when a sound pressure level for a particular frequency band exceeds the loudness discomfort level for the band. The channel amplifier for that channel in the amplifier means 30 is adjusted by the signal processor means 24 to minimize the duration of the sound pressure level remaining at the loudness discomfort level or stop the sound pressure level from reaching the loudness discomfort level when an undesirable rise in the sound pressure level is first detected. This process also prevents the occurrence of acoustic feedback resonances.

Specifically, the control electrical signals are received in a first signal averager 76 that has a means for the storage of control electrical signals over time and a means for the computation of an average of the control electrical signals such as a running average. Because of the very nature of speech where the sound pressure levels range from full volume to zero and return to full volume within fractions of a second, an average of the sound pressure levels is preferred for control purposes instead of a sound pressure level at an instant. The first signal averager 76 in the preferred embodiment computes a short term running average control electrical signal.

The short term average control electrical signal developed by the first signal averager 76 is sampled by a spectrum analyzer 78 to develop frequency domains from the time series of the control electrical signal using the Fourier transformation process. The spectrum that results represents the short term average of the sound pressure levels of all of the frequencies in the ear canal 44. A first comparator 80 compares the actual sound pressure levels received through line 82 from the spectrum analyzer 78 to desired sound pressure levels supplied to the first comparator 80 through a line 84 from a system controller and storage 86. The comparison can be made using either an analog or digital data basis. Since the desired sound pressure levels are stored as digital data and the actual sound pressure levels are developed by the spectrum analyzer 78 as analog data, an analog to digital converter or a digital to analog converter is required depending upon the comparison basis selected to make the operation of the first comparator 80 possible. Differences from the desired levels are developed by the first comparator 80 for each frequency channel of the plurality of channels A to N in the amplifier means 30. Channel control signals are then passed through the line 88 to the system controller and storage 86 and line 36 to the plurality of channel amplifiers 34 to individually control the gain of the channel amplifiers for channels A to N to achieve the desired sound pressure levels at each frequency level in the ear canal 44.

The short term average control signal developed by the first averager 76 is also used by a second averager 90 to compute a long term average control signal for controlling the line amplifier 52. A second comparator 92 compares the long term average of the actual sound pressure levels received through a line 94 from the second averager 90 to a desired long term average sound pressure level supplied to the second comparator 92 through a line 96 from the system controller and storage 86. Differences from the desired level are computed by the second comparator 92 and long term control signals are developed that are then passed through a line 98 to the system controller and storage 86 and line 58 to control the gain of the line amplifier 52. The line amplifier 52 is thereby controlled to always maintain an absolute level of output to the receiver 56 within predetermined limits.

Figure 3:
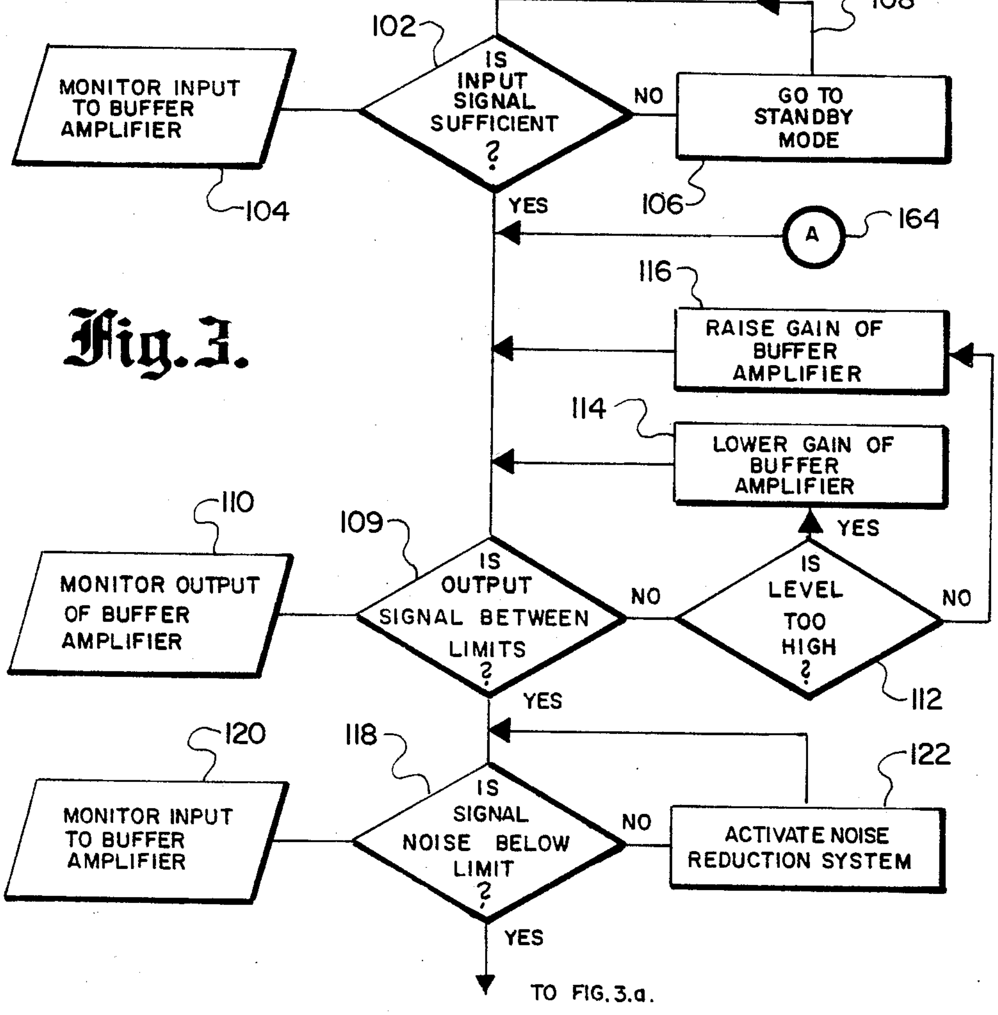

FIG. 3 is a flow chart depicting an exemplary signal processing methodology and structure in accordance with the principles of the present invention. The operation is initiated by the entry of a predetermined set of instructions for a hearing impaired individual (input block 100) into the signal processor means 24 illustrated in FIGS. 1 and 2. Most of the instructions in the predetermined set of instructions are standard instructions developed to operate the hearing aid 10 for a variety of hearing impaired individuals. Some of the instructions are developed for a specific individual after the testing of the specific hearing impairments of the individual by various methods: with outside equipment, with the hearing aid 10 on the individual, or with a combination of both procedures. The portion of the set of instructions that do not change from individual to individual are preferrably retained in a read only memory (ROM) while the portion of the set of instructions that vary from individual to individual are retained in a re-programmable read only memory (REPROM) that is programmed after the desired specific instructions for an individual are determined.

When the hearing aid 10 is first turned on, an initial set of operating parameters is sent by the signal processor means 24 to all of the components of the hearing aid 10 that are controlled by the signal processor means 24 to begin the actual operation of the hearing aid 10. The testing and modification of the output of the hearing aid 10 then begins almost immediately in accordance with the methodology and structure described in FIG. 3. It will be appreciated that while FIG. 3 illustrates a sequence of computational steps in series, one or more of the functions of the hearing aid 10 may be controlled by the signal processor means 24 simultaneously in parallel.

The first test performed by the hearing aid 10 is to determine whether or not the sounds being received have a predetermined intensity and duration (test block 102). A sample (input block 104) of the electrical signals entering the buffer amplifier 22 is compared to the predetermined set of instructions. If the sounds do not have the predetermined intensity and duration, the signal processor means 24 instructs the hearing aid 10 to go into a standby mode (process block 106) in order to conserve electric power. All systems except for the systems required to conduct the initial test are shut down. A logic loop 108 results with the same test (test block 102) being repeated indefinitely until sounds having sufficient intensity and duration are detected. The signal processor means 24 then returns the hearing aid 10 to full power under the initial set of operating parameters.

The next test monitors the output of the buffer amplifier 22 to insure that a desired signal level is maintained to permit the remainder of the circuits to function optimally (test block 109). The actual output level (input block 110) is compared to the limits defined in the predetermined set of instructions. If the level is not within the limits, a second test (test block 112) is made to determine if the output is too high. If the output is too high, the signal processor means 24 lowers the gain of the buffer amplifier 22 (process block 114). If the output is not too high, the signal processor means 24 raises the gain of the buffer amplifier 22 (process block 116).

When the output of the buffer amplifier 22 is within the limits, the next test is initiated to determine whether the signal to noise ratio is below a desired limit (test block 118). The input of the buffer amplifier is monitored (input block 120) to provide data for the test. If the signal to noise ratio is not below the limit, the noise reduction system 46 in FIG. 1 is activated (process block 122) to reduce the noise level.

The remaining steps in the signal processing sequence utilize data derived from the feedback microphone 64 in FIGS. 1 and 2 to control the remaining amplification of the hearing aid 10. The first test concerns the limits of the overall sound pressure level output of the hearing aid 10 and is designed to minimize the occurrence of sound pressure levels over the long term that exceed the loudness discomfort level and to optimize the average sound pressure levels over the long term. As discussed above in conjunction with FIG. 1, the control electrical signals from the feedback microphone 64 are stored over time and averaged into short term averages by the first averager 76. The second averager 90 receives and stores the short term averages developed by the first averager 76 over time and computes a long term average. The long term average of the second averager 90 is monitored (input block 124) to determine whether the average long term sound pressure level is within the desired limits (test block 126). If the level is not within the limits, a second test is made to determine if the level is too high (test block 128). If the level is too high, the signal processor means 24 lowers the gain of the line amplifier 52 (process block 130) to minimize the possibility of exceeding the loudness discomfort level. If the level is not too high, the signal processor means 24 raises the gain of the line amplifier 52 (process block 132) to optimize the overall sound pressure levels.

The final steps in the signal processing sequence also utilize data derived from the feedback microphone 64 in FIGS. 1 and 2. The short term average developed by the first averager 76 is sampled by the spectrum analyzer 78 to develop a spectrum representing the sound pressure levels for all of the frequency bands at the eardrum. The spectrum is then swept cyclically one frequency band at a time from frequency band "a" to "b" through all of the intermediate bands to band "n" (input blocks 134, 136, and 138). The portion of the spectrum representing the actual average short term sound pressure level for a particular frequency band is then compared to the predetermined set of instructions regarding the particular band (test blocks 140, 142, and 144). If the sound pressure level (SPL) in a particular band is within the predetermined limits, the program moves to the next band. If the sound pressure level is not within the limits, a second test is made to determine if the level is too high (test blocks 146, 148, and 150). If the level is too high, the signal processor means 24 lowers the gain of the channel amplifier for the appropriate band-pass channel (process blocks 152, 154, and 156) to further minimize the possibility of exceeding the loudness discomfort level in the particular frequency band. If the level is not too high, the signal processor means 24 raises the gain of the channel amplifier for the appropriate band-pass channel (process blocks 158, 160, and 162) to optimize the sound pressure levels in the particular frequency band.

When the last operation is completed on band "n", the program loops back (loop 164) to start the entire process over. The process never ends as long as the hearing aid 10 is turned on. In this manner, the operation of the hearing aid 10 is continually changed according to the ambient operating conditions.

In view of the above, it may be seen that a processor controlled ear responsive hearing aid and method are provided that monitor the output of the hearing aid according to actual sound pressure levels at the eardrum and then control the hearing aid performance to prevent exceeding the loudness discomfort level while optimizing performance under various conditions of input speech loudness, environmental and interfering noise, and other disturbing factors. Of course, the structure and method may be variously implemented and variously used depending upon specific applications. Accordingly the scope hereof shall not be referenced to the disclosed embodiment, but on the contrary, shall be determined in accordance with the claims as set forth below.

I claim:

1. A processor controlled ear responsive hearing aid for an individual comprising:

- a first input circuit means for receiving and converting sound waves to electrical signals;
- an amplifier means for amplifying the electrical signals from the first input circuit means to provide an amplified output;
- an output circuit means for receiving and converting the amplified output to sound waves and delivering the sound waves to the ear canal of the individual;
- a second input circuit means for receiving and converting sound waves inside the ear canal to control electrical signals representing sound pressure levels; and
- a signal processor means for receiving the control electrical signals from the second input circuit means, comparing the control electrical signals to a predetermined set of instructions, and controlling the amplification of the amplifier means to achieve desired sound pressure levels.

2. A processor controlled ear responsive hearing aid according to claim 1 wherein the amplifier means includes a plurality of band-pass channels receiving the electrical signals from the first input circuit means and providing a combined amplified output, each of the plurality of band-pass channels having:

- a band-pass filter for attenuating frequencies outside a preselected range; and
- a channel amplifier controlled by the signal processor means for amplifying the electrical signals passed by the band-pass filter and providing an amplified output.

3. A processor controlled ear responsive hearing aid according to claim 2 wherein the signal processor means converts the control electrical signals into a spectrum of all the frequencies corresponding to the frequencies of the plurality of band-pass channels, compares the spectrum to the predetermined set of instructions, and controls each of the channel amplifiers to achieve the desired sound pressure levels for each band-pass channel.

4. A processor controlled ear responsive hearing aid according to claim 3 wherein the signal processor means sweeps the spectrum cyclically, compares the portion of the spectrum representing a particular frequency band to the predetermined set of instructions regarding the particular frequency band, and controls the channel amplifier for the particular frequency band to achieve the desired sound pressure levels.

5. A processor controlled ear responsive hearing aid according to claim 2 wherein the signal processor means further comprises a means for the storage of control electrical signals over time and a means for the computation of average control electrical signals from the stored electrical signals and wherein the signal processor means converts the average control electrical signals into a spectrum of all of the frequencies corresponding to the frequencies of the plurality of band pass channels, compares the spectrum to the predetermined set of instructions, and controls each of the channel amplifiers to achieve the desired sound pressure levels for each band-pass channel.

6. A processor controlled ear responsive hearing aid according to claim 1 wherein the first input circuit means further includes an equalizer to provide a desired response over the frequency range of the electrical signals.

7. A processor controlled ear responsive hearing aid according to claim 1 wherein the first input circuit means further includes an input band-pass filter for attenuating frequencies in the electrical signals above and below a predetermined bandwidth.

8. A processor controlled ear responsive hearing aid according to claim 1 wherein the first input circuit means further includes a preamplifier for amplifying the electrical signals providing a preamplifier output.

9. A processor controlled ear responsive hearing aid according to claim 8 wherein the output of the preamplifier is controlled by the signal processor means.

10. A processor controlled ear responsive hearing aid according to claim 1 wherein the output circuit means further includes an amplifier for amplifying the electrical signals providing an amplifier output.

11. A processor controlled ear responsive hearing aid according to claim 10 wherein the output of the amplifier in the output circuit means is controlled by the signal processor means.

12. A processor controlled ear responsive hearing aid according to claim 5 wherein the output circuit means further includes an amplifier for amplifying the electrical signals providing an amplifier output and the signal processor means controls the output of the amplifier in the output circuit means by comparing average control electrical signals to the predetermined set of instructions to achieve the desired overall sound pressure level in the ear canal.

13. A processor controlled ear responsive hearing aid according to claim 2 wherein the frequencies of a band-pass channel are logarithmically related to the frequencies of the adjacent band-pass channels.

14. A processor controlled ear responsive hearing aid according to claim 13 wherein the logarithmic relationship is a constant fraction equal to one-third of an octave.

15. A processor controlled ear responsive hearing aid according to claim 2 wherein the frequencies of a band-pass channel are linearly related to the frequencies of the adjacent band-pass channels.

16. A processor controlled ear responsive hearing aid according to claim 2 wherein the frequencies of a band-pass channel are non-linearly related to the frequencies of the adjacent band-pass channels.

17. A processor controlled ear responsive hearing aid according to claim 16 wherein the non-linear relationship is one of critical bands and equal articulation index bands.

18. A processor controlled ear responsive hearing aid according to claim 1 wherein the signal processor means places the processor controlled ear responsive hearing aid in a standby mode in order to conserve electric power when the level of the sound outside the ear canal remains below a predetermined intensity and duration and returns the processor controlled ear responsive hearing aid to full power when the level of the sound outside the ear canal exceed a predetermined intensity and duration.

19. A method for operating a hearing aid comprising the steps of:
- receiving and converting ambient sound waves to electrical signals;
- amplifying the electrical signals to provide an amplified output;
- converting the amplified output to sound waves and delivering the sound waves to an ear canal;
- receiving and converting sound waves inside the ear canal to control electrical signals representing sound pressure levels;
- comparing the control electrical signals to a predetermined set of instructions; and
- controlling the level of amplification to achieve desired sound pressure levels.

20. A method for operating a hearing aid as recited in claim 19 wherein the amplifying the electrical signals to provide an amplified output includes:
- band-pass filtering the electrical signals into a plurality of band-pass channels;
- amplifying the electrical signals in each channel separately; and
- combining the amplified electrical signals from all of the channels into a combined amplified output.

21. A method for operating a hearing aid as recited in claim 20 wherein the comparing the control electrical signals to a predetermined set of instructions includes:
- converting the control electrical signals into a spectrum of the sound pressure levels of all the frequencies corresponding to the frequencies of the plurality of band-pass channels;
- comparing the spectrum of the sound pressure levels to the predetermined set of instructions; and
- controlling the amplification of the electrical signals in each of the channels to achieve the desired sound pressure levels for each band-pass channel.

22. A method for operating a hearing aid as recited in claim 21 wherein the comparing the spectrum of the sound pressure levels to the predetermined set of instructions includes:
- sweeping the spectrum of the sound pressure levels cyclically; and
- comparing the portion of the spectrum of the sound pressure levels representing a particular band-pass channel to the predetermined set of instructions regarding the particular band-pass channel.

23. A method for operating a hearing aid as recited in claim 20 further comprising the steps of:
- storing the control electrical signals over time; and
- computing average control electrical signals from the stored control electrical signals; wherein the comparing the control electrical signals to a predetermined set of instructions includes:
- converting the average control electrical signals into a spectrum of the sound pressure levels of all the frequencies corresponding to the frequencies of the plurality of band-pass channels;
- comparing the spectrum of the sound pressure levels to the predetermined set of instructions; and
- controlling the amplification of the electrical signals in each of the channels to achieve the desired sound pressure levels for each band-pass channel.

24. A method for operating a hearing aid as recited in claim 23 wherein the comparing the control electrical signals to a predetermined set of instructions includes comparing the average control electrical signals to the predetermined set of instructions and wherein the controlling the level of amplification to achieve desired sound pressure levels includes controlling the overall level of amplification to achieve the overall average desired sound pressure levels according to the comparison of the average control electrical signals to the predetermined set of instructions.

* * * * *